(12) United States Patent
Yang et al.

(10) Patent No.: US 8,411,310 B2
(45) Date of Patent: Apr. 2, 2013

(54) METHODS AND SYSTEMS FOR SCANNING AND PROCESSING AN IMAGE USING THE ERROR DIFFUSION SCREENING TECHNOLOGY

(75) Inventors: Bin Yang, Beijing (CN); Haifeng Li, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 961 days.

(21) Appl. No.: 12/438,533

(22) PCT Filed: Aug. 22, 2007

(86) PCT No.: PCT/CN2007/002541
§ 371 (c)(1),
(2), (4) Date: Jun. 15, 2009

(87) PCT Pub. No.: WO2008/028406
PCT Pub. Date: Mar. 13, 2008

(65) Prior Publication Data
US 2009/0296165 A1 Dec. 3, 2009

(30) Foreign Application Priority Data

Aug. 22, 2006 (CN) .......................... 2006 1 0112497

(51) Int. Cl.
*G06K 15/00* (2006.01)
(52) U.S. Cl. ....... 358/1.16; 358/1.9; 358/3.03; 358/3.06
(58) Field of Classification Search ........ 358/3.03–3.21, 358/533–536; 382/252
See application file for complete search history.

(56) References Cited

U.S. PATENT DOCUMENTS 5,684,932 A * 11/1997 Shu ............................... 358/1.9
(Continued)

FOREIGN PATENT DOCUMENTS

| CN | 1188581 A | 7/1998 |
| CN | 1469249 A | 1/2004 |

(Continued)

*Primary Examiner* — Richard Zhu
(74) *Attorney, Agent, or Firm* — The Webb Law Firm (57) ABSTRACT

Disclosed is a method for scanning and processing an image using the error diffusion screening technology, comprising: (1) scanning each pixel $M_i$ of an $n^{th}$ line in an original image one by one and then storing a scanning result of the pixel $M_i$ to an $i^{th}$ storage location; and (2) processing the stored result of the pixel $M_i$ by using error diffusion and scanning pixels of an $n+1^{th}$ line in the original image until all pixels of the $n^{th}$ line have been processed and all pixels in the $n+1^{th}$ line have been scanned and stored, wherein once processing for the pixel $M_i$ is completed, a scanning result of a pixel of the $n+1^{th}$ line is stored to the $i^{th}$ storage location previously occupied by the pixel $M_i$. Based on the method, the capacity for storing is only required to be able to store the data of one line in an image in the scanning direction, which saves the storage for bidirectional scanning. The method can optimize the hardware used to implement error diffusion and improve the operating efficiency. Also disclosed is a system for achieving the method.

19 Claims, 4 Drawing Sheets

U.S. PATENT DOCUMENTS

| | | | | |
|---|---|---|---|---|
| 5,692,109 A | * | 11/1997 | Shu | ................................ 358/1.9 |
| 6,011,878 A | | 1/2000 | Ushida et al. | |
| 6,256,049 B1 | | 7/2001 | Hein | |
| 6,271,936 B1 | | 8/2001 | Yu et al. | |
| 6,510,252 B1 | * | 1/2003 | Kishimoto | ..................... 382/252 |
| 7,081,972 B2 | * | 7/2006 | Fukao | ........................... 358/3.04 |
| 7,352,494 B2 | | 4/2008 | Tsumura et al. | |
| 7,551,323 B2 | * | 6/2009 | Bailey et al. | ................. 358/3.03 |
| 7,826,096 B2 | * | 11/2010 | Chiwata | ....................... 358/3.04 |

FOREIGN PATENT DOCUMENTS

| | | |
|---|---|---|
| CN | 1668063 A | 9/2005 |
| CN | 1700730 A | 11/2005 |
| CN | 1750081 A | 3/2006 |
| CN | 1909592 A1 | 2/2007 |
| EP | 1909482 A1 | 9/2008 |
| JP | 9018684 A | 1/1997 |
| JP | 10108009 A | 4/1998 |
| WO | 0019704 A1 | 4/2000 |

\* cited by examiner

METHODS AND SYSTEMS FOR SCANNING AND PROCESSING AN IMAGE USING THE ERROR DIFFUSION SCREENING TECHNOLOGY

FIELD OF THE INVENTION

The present invention relates to a method for scanning and processing data in the field of hard copying for image duplication, more particularly to a method and system for scanning and processing an image using the error diffusion screening technology.

BACKGROUND OF THE INVENTION

The conventional method for scanning and processing an image is unidirectional, which will results in textures, degrade the random characteristic based on the error diffusion, and thus impact the quality of the output. The method of bidirectional scanning and processing an image can address the problems in a certain extent. In the method of bidirectional scanning and processing, lines of the image is scanned and processed in two directions, alternatively (i.e. from the left to the right for one line and from the right to the left for the next line). Currently, many methods for scanning and processing an image on the basis of the error diffusion are bidirectional.

However, the method of bidirectional scanning and processing needs to operate an image pixel by pixel, which results in a low efficiency. The general method for solving this problem is to improve the hardware. If pixels are scanned one by one in a single direction, a pixel can be processed and output as soon as the pixel is scanned, without needing buffer storage for data of the scanned pixels. However, when a method of bidirectional scanning and processing is used, the results of error operation of the processed pixels should be weightedly added to adjacent unprocessed pixels according to the principle of error diffusion. Some of the unprocessed pixels are in the next line which is un-scanned. Therefore, if pixels are scanned and processed bidirectionally, the data of pixels scanned in two different directions must be stored and then processed one by one. Particularly, in the event of bidirectional scanning and processing, if the current line is scanned from the left to the right, the next line will be scanned from the right to the left. Before the firstly scanned pixel in the next line is processed, errors of last several scanned pixels in the current line are needed to be diffused to the firstly scanned pixel in the next line. Therefore, the value of error diffusion for a pixel in the next line can be obtained only after all pixels in the current line are scanned and processed.

The inventors have disclosed a method for screening in a previously filed Chinese patent application No. 200510068127.8 published on Sep. 14, 2005, entitled "method for frequency-modulation screening using error diffusion based on dual-feedback", which is incorporated herein by reference. According to the method, an FM-AM mixed screening can be achieved by using a dual-feedback error diffusion technology. However, the method also needs to previously store the data of pixels scanned in two different directions and then process the stored data one by one so as to achieve the bidirectional scanning.

SUMMARY OF THE INVENTION

To overcome the shortcomings of the prior art, the present invention is to provide a method for scanning and processing an image using the error diffusion screening technology, comprising: (1) scanning each pixel $M_i$ of an $n^{th}$ line in an original image one by one and then storing a scanning result of the pixel $M_i$ to an $i^{th}$ storage location; and (2) processing the stored result of the pixel $M_i$ by using error diffusion and scanning pixels of an $n+1^{th}$ line in the original image until all pixels of the $n^{th}$ line have been processed and all pixels in the $n+1^{th}$ line have been scanned and stored, wherein once processing for the pixel $M_i$ is completed, a scanning result of a pixel of the $n+1^{th}$ line is stored to the $i^{th}$ storage location previously occupied by the pixel $M_i$.

According to another aspect, the present invention is to provide a system for scanning and processing an image using the error diffusion screening technology, comprising a scanning device, a storing device and a processing device, wherein the scanning device has an output terminal connected to an input terminal of the storing device, the storing device has an output terminal connected to an input terminal of the processing device, the scanning device scans each pixel $M_i$ of an $n^{th}$ line in an original image one by one, and a scanning result of the pixel $M_i$ is stored to the storing device; and wherein the processing device processes stored data for the pixel $M_i$ by using error diffusion, once processing for the pixel $M_i$ is completed, a obtained value for the pixel $M_i$ is output so that an $i^{th}$ storage location in the storing device can be idle, at the same time, the scanning device scans pixels of an $n+1^{th}$ line in the original image, once the $i^{th}$ storage location in the storing device is idle, scanned data for a pixel in the $n+1^{th}$ line is stored to the $i^{th}$ storage location, and once all pixels in the $n^{th}$ line have been processed, all pixels in the $n+1^{th}$ line have been scanned and stored.

The present invention has at least one of the following effects. Based on the method of bidirectional scanning and processing an image using the error diffusion, the capacity for storing is only required to be able to store the data of one line in an image in the scanning direction, which saves the storage for bidirectional scanning. The method and system of the present invention can optimize the hardware used to implement error diffusion, improve the operating efficiency, and save the cost of hardware.

DESCRIPTION OF THE PREFERRED EMBODIMENTS

Hereinafter, a detailed description of the present invention will be given with reference to the appended drawings and embodiments.

Figure 2:
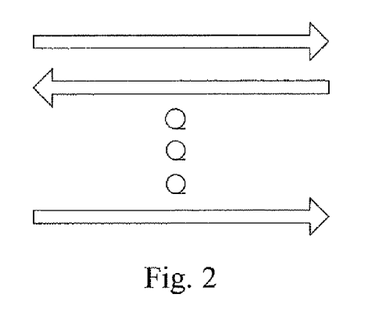
FIG. 2 is a schematic diagram illustrating bidirectional scanning and processing.

The following embodiments are based on 2-bit imaging depth and bidirectional scanning and processing for the original image as shown in FIG. 2.

Figure 1:
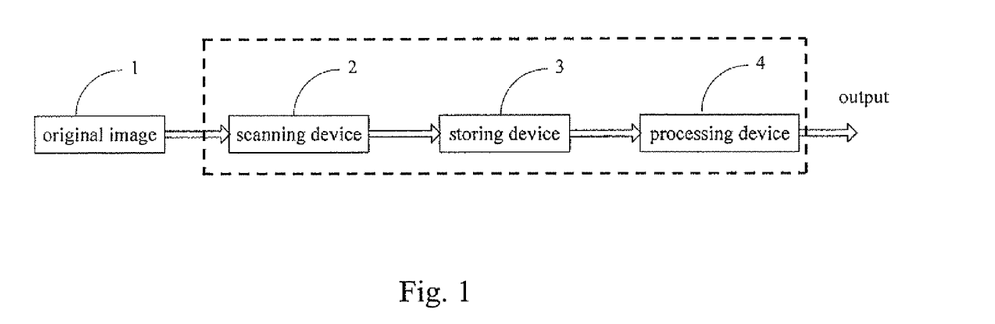
FIG. 1 is a diagram illustrating a system for scanning and processing an image according to an embodiment of the present invention.

FIG. 1 shows a system for scanning and processing an image using the error diffusion screening technology according to an embodiment of the present invention. As shown in FIG. 1, the system comprises a scanning device 2, a storing device 3 and a processing device 4. An original image 1 can be input to the system by an input terminal of the scanning device 2. An output terminal of the scanning device 2 is connected to an input terminal of the storing device 3 and an output terminal of the storing device 3 is connected to an input terminal of the processing device 4. The result of the processing device 4 will be the output of the system. The scanning device 2 scans, one by one, the pixels of the current line (for example, the $n^{th}$ line) in the original image 1 from the beginning to the end. The scanned data for each pixel $M_i$ is stored to the $i^{th}$ location in the storing device 3. The stored data for each pixel $M_i$ is processed by the processing device 4 by using error diffusion. Once the processing for a pixel is completed, the obtained value for the pixel is output so that the $i^{th}$ location in the storing device 3 can be idle. At the same time, the scanning device 2 scans the pixels of the next line (i.e. the $n+1^{th}$ line) in the original image 1. Once the $i^{th}$ location in the storing device 3 is idle, the scanned data for a pixel in the $n+1^{th}$ line is stored to this $i^{th}$ location. Once all the pixels in the $n^{th}$ line have been processed, all the pixels in the $n+1^{th}$ line have been scanned and stored.

In this disclosure, C is defined to indicate the direction for processing the current line (the $n^{th}$ line). C=0 indicates that the pixels in the current line are processed from the beginning to the end; and C=1 indicates that the pixels in the current line are processed from the end to the beginning.

H is defined to indicate the storage location in the storing device 3 of the beginning pixel of a line. H=0 indicates that the beginning pixel of a line is stored in the first location in the storing device 3; and H=1 indicates that the beginning pixel of a line is stored in the last location in the storing device 3.

Figure 7:
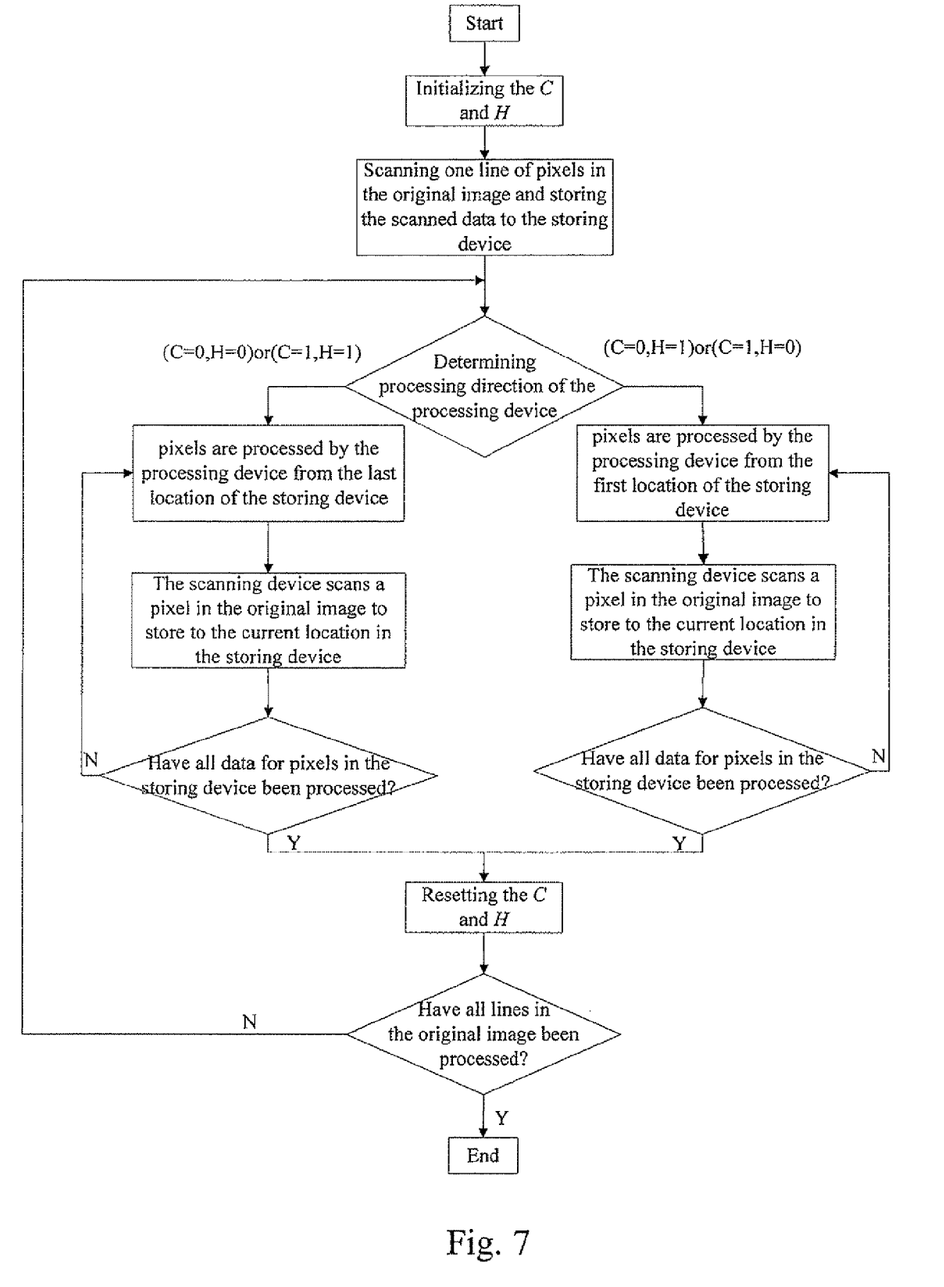
FIG. 7 is a schematic diagram of a process according to an embodiment of the present invention.

As shown in FIG. 7, a method for scanning and processing an image using the error diffusion screening technology according to an embodiment of the present invention comprises the following steps.

Figure 3:
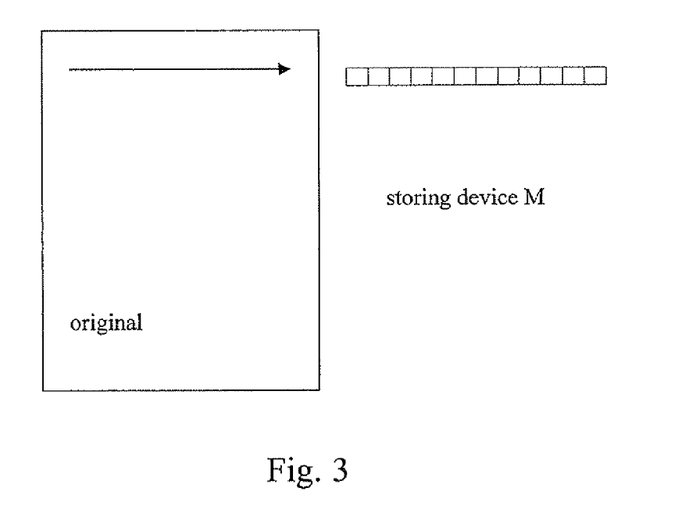
FIG. 3 is a schematic diagram illustrating the scanning for the first line of an image.

Step 1 is to scan, one by one, the pixels of the $n^{th}$ line (n=1, 2, 3 ...) in the original image 1 from the beginning to the end after the C and H are initialized and then store the value g(m, t) of each pixel $M_i$, as shown in FIG. 3.

Step 2 is to process the stored value g(m, t) of each pixel $M_i$ by using error diffusion according to the processing direction determined by C and H and scan the pixels of the next line (i.e. the $n+1^{th}$ line) in the original image 1 one by one from the beginning to the end. Once the processing for a pixel is completed, the obtained value for the pixel is output so that the $i^{th}$ storage location occupied by the pixel can be idle. Then, the scanned data for a scanned pixel of the $n+1^{th}$ line is stored to the idle $i^{th}$ storage location. Once all the pixels in the $n^{th}$ line have been processed, all the pixels in the $n+1^{th}$ line have been scanned and stored.

In Step 2, the C indicating the direction for processing the current line and the H indicating the storage location of the beginning pixel of the next line in the storing device 3 are recorded.

The processing direction of the processing device 4 is determined by C and H according to the following conditions.

(1) If C=0 and H=0, the pixels in the next line are processed by the processing device 4 from the last location to the first location of the storing device 3.

(2) If C=0 and H=1, the pixels in the next line are processed by the processing device 4 from the first location to the last location of the storing device 3.

(3) If C=1 and H=0, the pixels in the next line are processed by the processing device 4 from the first location to the last location of the storing device 3.

(4) If C=1 and H=1, the pixels in the next line are processed by the processing device 4 from the last location to the first location of the storing device 3.

Hereinafter, a detailed description of the processing and storing routine of the pixels according to the present method will be given with reference to the example shown in FIGS. 4 and 5.

Figure 4:
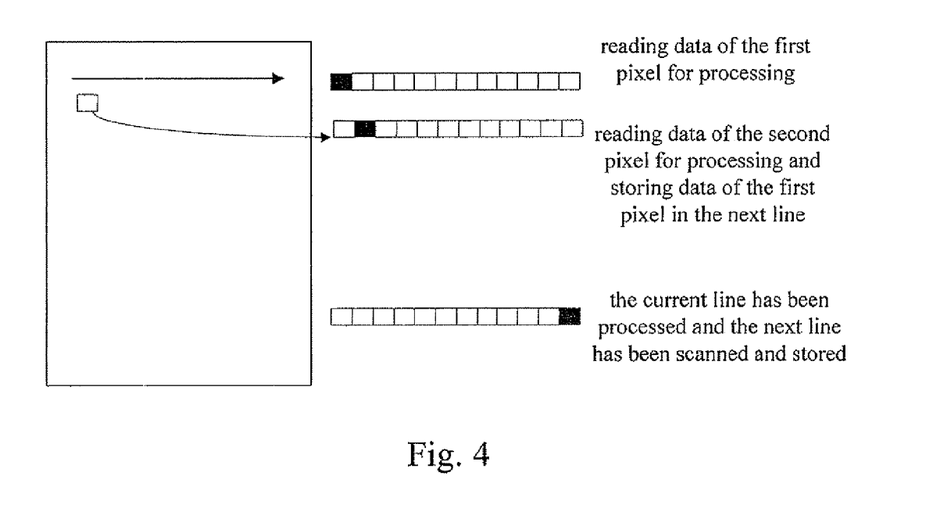
FIG. 4 is a schematic diagram illustrating the processing for the first line of the image and the scanning for the second line of the image at the same time.

As shown in FIG. 4, after all the pixels in the $n^{th}$ line (assuming n=1) are scanned and stored, the processing device 4 is started to read and process the stored data for the first pixel from the left in the $n^{th}$ line. After the stored data for the first pixel is processed, the stored data for the second pixel in the $n^{th}$ line is read and processed by the processing device 4 and the data for the first pixel in the $n+1^{th}$ line (i.e. the $2^{nd}$ line) is stored in the first location of the storing device 3, which is just idle. The above steps are repeated until all the pixels in the $1^{st}$ line are processed and all the pixels in the $2^{nd}$ line are stored. Now, C=0 and H=0, which complies with the above condition (1).

Figure 5:
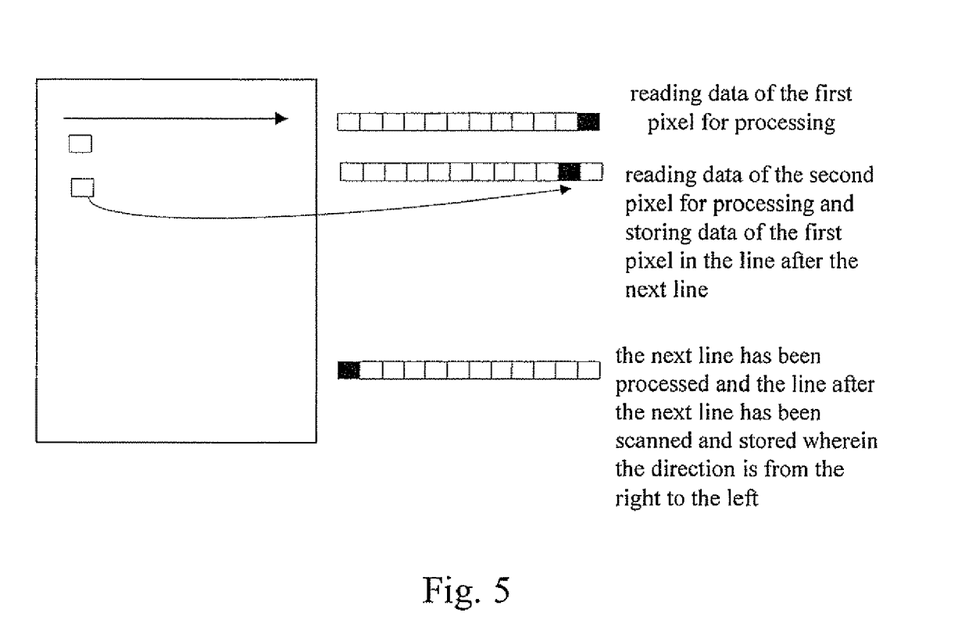
FIG. 5 is a schematic diagram illustrating the processing for the second line of the image and the scanning for the third line of the image at the same time.

As shown in FIG. 5, after the processing for the $1^{st}$ line and the storing for the $2^{nd}$ line are completed, the processing device 4 is started to read and process the data stored in the storing device 3 from the last location to the first location. That is to say, after the data for the pixel in the $2^{nd}$ line which is stored in the last location of the storing device 3 is processed, the data stored in the second last location is read and processed by the processing device 4 and the data for the first pixel in the $3^{rd}$ line is stored in the corresponding idle location of the storing device 3. The above steps are repeated until all the pixels in the $2^{nd}$ line are processed and all the pixels in the $3^{rd}$ line are stored Now, C=1 and H=1, which complies with the above condition (4).

The whole original image 1 can be scanned and processed by repeating the above steps. For saving the storage, the capacity of the storing device 3 is only required to be able to store the data for one line in the original image 1 in the scanning direction.

In this embodiment, the process implemented by the processing device 4 is based on the FM screening method using the dual-feedback error diffusion. The detailed process is described as below.

(a) The original image is scanned and input. An operation of a threshold comparison is carried out on the final value g"(m, t) of the current pixel in the original image. The result of the operation is converted to the output value b(m, t) of the current pixel. The operation of a threshold comparison and the conversion for the result of the operation is conventional, which will not be described in detail herein.

(b) The output value b(m, t) of the current pixel is compared with the medium value g'(m, t) of the current pixel to obtain the error value e(m, t) of the current pixel.

(c) The error value e(m, t) is multiplied by certain weight distribution coefficients through a first diffusion filter e. Then, the results of multiplying are diffused to those unprocessed pixels around the current pixel. Each of the diffused results to the unprocessed pixels around the current pixel is weightedly added to the original value g(m, t) of the pixel ($M_x$) to obtain a new medium value g'(m, t) of the corresponding pixel $M_x$. The error diffusion filter uses a diffusion principle and weight distribution coefficients as below:

|     |     | **    | $d_5$ | $d_3$ |
| --- | --- | ---   | ---   | ---   |
| $d_2$ | $d_4$ | $d_5$ | $d_4$ | $d_2$ |
| $d_1$ | $d_2$ | $d_3$ | $d_2$ | $d_1$ | wherein,  represents the current pixel's position and each of $d_1$ to $d_5$ on the other positions represents the diffusion weight coefficient relative to the current pixel . $d_1$ to $d_5$ are taken in [0, 1] and satisfy the following expression:

$$2 \times d_1 + 4 \times d_2 + 2 \times d_3 + 2 \times d_4 + 2 \times d_5 \in [0,1].$$

In the embodiment, the coefficients are set as:

$$d_1=1/44,\ d_2=2/44,\ d_3=5/44,\ d_4=4/44,\ d_5=8/44.$$

From the above, the first diffusion feedback operation is accomplished.

(d) This step is implemented in parallel with the steps (b) and (c). Processed results are respectively diffused to corresponding pixels $M_x$, surrounding the current pixel, and each of the diffused processed results are weightedly added to the medium value g'(m, t) of the corresponding pixel $M_x$, obtained from error diffusion in the steps (b) and (c) to obtain the final value g''(m, t) of the corresponding pixel $M_x$, wherein the processed results are obtained by implementing a multiplying operation on the output value b(m, t) of the current pixel using a second diffusion filter w and processing the results of the multiplying operation with the dithering algorithm. The diffusion mode of the second diffusion filter w is set as:

|       | **    | $w_0$ |
| ---   | ---   | ---   |
| $w_3$ | $w_2$ | $w_1$ | wherein, the scanning direction is from left to right, ** represents the current pixel's position and each of $w_0$ to $w_3$ on the other positions represents the diffusion weight coefficient relative to the current pixel. The parameters are taken in [0, 1] and satisfy the following expression:

$$w_{sum}=(w_0+w_1+w_2+w_3)\in[0,1].$$

The dithering algorithm in the embodiment uses the following Formula:

$$f\text{Rand}=(R(m,t)/R\_\text{MAX}-0.5)\times c\text{Dither}$$

$$dw_0=w_0-f\text{Rand}$$

$$dw_2=w_2+f\text{Rand}$$

$$dw_1=w_1+f\text{Rand}$$

$$dw_3=w_3-f\text{Rand}$$

In this Formula, fRand is a parameter for fine adjusting dithering; R(m, t) is a parameter with random value for scanning the current dot; R_MAX is the maximum of the random parameter R(i); cDither is a parameter for adjusting amplitude of dithering and determines the performance of amplitude-modulation; and $dw_0 \sim dw_3$ are the diffusion weight coefficients of the filter w in different directions after dithering. This step accomplishes the second diffusion feedback operation and implements the amplitude-modulation characteristic of the frequency-modulation screen.

In the embodiment, the coefficients are set as:

$$w_0=w_2=0.175,\ w_1=w_3=0.025,\ \text{then}\ w_{sum}=0.4$$

$$c\text{Dither}=0.2$$

During screening, the size of the frequency-modulation halftone dots is changed by adjusting $W_{sum}$ and the shapes of the frequency-modulation halftone dots is controlled by adjusting the values of $w_0 \sim w_3$.

(e) The steps (a)-(d) are repeated until the original input values g(m, n) of all the pixels are processed.

Figure 6:
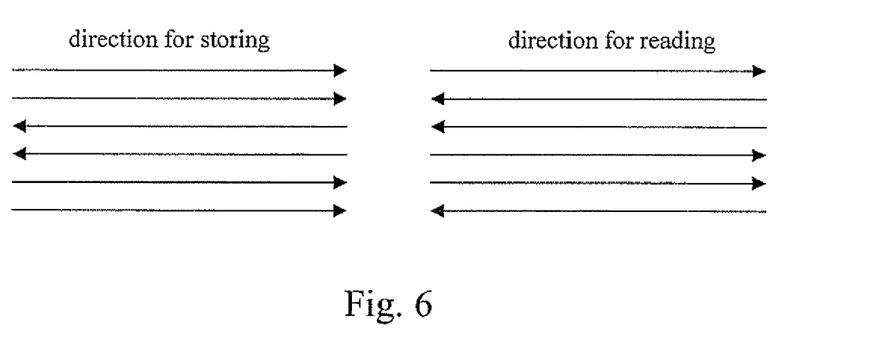
FIG. 6 is a schematic diagram illustrating the direction for storing the scanned data and the direction for processing the stored data.

According to the method for scanning and processing of the present invention, the directions shown in FIG. 6 can achieve the bidirectional scanning and processing shown in FIG. 2. Furthermore, the capacity of the storing device is only required to be able to store the data in one line in the original image 1 in the scanning direction, which can optimize the used hardware system.

The present invention is not limited to the embodiments mentioned above. The method of the present invention also can be based on the conventional bidirectional scanning and processing by using screening technology with one-time error diffusion. Other embodiments obtained by the skilled in the art according to the technical solutions in the present invention should be within the scope of the technical innovation of the present invention.

The invention claimed is:

1. A method for scanning and processing an image using the error diffusion screening technology, comprising:
    (1) scanning each pixel $M_i$ of an $n^{th}$ line in an original image one by one and then storing a scanning result of the pixel $M_i$ to an $i^{th}$ storage location; and
    (2) processing the stored result of the pixel $M_i$ by using error diffusion and scanning pixels of an $n+1^{th}$ line in the original image until all pixels of the nth line have been processed and all pixels in the $n+1^{th}$ line have been scanned and stored,
    wherein once processing for the pixel $M_i$ is completed, a scanning result of a pixel of the $n+1^{th}$ line is stored to the $i^{th}$ storage location previously occupied by the pixel $M_i$ and
    wherein the step (2) further comprises:
    recording a processing direction parameter C of the $n^{th}$ line and a storing location parameter H for a beginning pixel of the $n+1^{th}$ line; and
    determining the processing direction of the $n+1^{th}$ line based on values of the parameters C and H,
    wherein C=0 indicates that pixels in the $n^{th}$ line are processed from beginning to end; C=1 indicates that pixels in the $n^{th}$ line are processed from end to beginning; H=0 indicates that the beginning pixel of the $n+1^{th}$ line is stored in a first location of a storing device; and H=1 indicates that the beginning pixel of the $n+1^{th}$ line is stored in a last location of the storing device.

2. The method of claim 1, wherein the processing direction is determined by the parameters C and H according to following conditions:
    (1) If C=0 and H=0, pixels in the $n+1^{th}$ line are processed by a processing device from the last location of a storing device;
    (2) If C=0 and H=1, the pixels in the $n+1^{th}$ line are processed by the processing device from the first location of the storing device;
    (3) If C=1 and H=0, the pixels in the $n+1^{th}$ line are processed by the processing device from the first location of the storing devices;

(4) If C=1 and H=1, the pixels in the n+1$^{th}$ line are processed by the processing device from the last location of the storing device.

3. The method of claim 1, wherein the error diffusion further comprises:
- (a) scanning and inputting the original image, carrying out an operation of a threshold comparison on a final value g"(m, t) of a current pixel in the original image, and then converting a result of the operation to an output value b(m, t) of the current pixel;
- (b) comparing the output value b(m, t) of the current pixel with a medium value g'(m, t) of the current pixel to obtain an error value e(m, t) of the current pixel;
- (c) multiplying the error value e(m, t) by preset weight distribution coefficients through a first diffusion filter e and then diffusing results of the multiplying to unprocessed pixels around the current pixel, wherein each of the diffused results to the unprocessed pixels around the current pixel is weightedly added to an original value g(m, t) of the pixel $M_x$ to obtain a new medium value g'(m, t) of the pixel $M_x$;
- (d) diffusing processed results to corresponding pixels $M_x$ surrounding the current pixel, respectively, and weightedly adding each of the diffused processed results to the medium value g'(m, t) of the corresponding pixel $M_x$ obtained from error diffusion in the step (c) to obtain the final value g"(m, t) of the corresponding pixel $M_x$, wherein the processed results are obtained by implementing a multiplying operation on the output value b(m, t) of the current pixel using a second diffusion filter w and processing results of the multiplying operation with a dithering algorithm, and the step (d) is implemented in parallel with the steps (b) and (c); and
- (e) repeating the steps (a)-(d) until the original input values g(m, t) of all pixels are processed.

4. The method of claim 3, wherein the first error diffusion filter e in the step (c) uses a diffusion principle and weight distribution coefficients as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein,  represents the current pixel's position, each of $d_1$ to $d_5$ on other positions represents the diffusion weight coefficient relative to the current pixel , and $d_1$ to $d_5$ are taken in [0, 1] and satisfy the following expression:

$$2\times d_1+4\times d_2+2\times d_3+2\times d_4+2\times d_5 \in [0,1].$$

5. The method of claim 4, wherein a diffusion mode of the second diffusion filter w is set as:

|       | **    | $w_0$ |
|-------|-------|-------|
| $w_3$ | $w_2$ | $w_1$ | wherein, a scanning direction is from left to right, ** represents the current pixel's position, each of $w_0$ to $w_3$ on other positions represents the diffusion weight coefficient relative to the current pixel, and $w_0$ to $w_3$ are taken in [0, 1] and satisfy the following expression:

$$w_0+w_1+w_2+w_3 \in [0,1].$$

6. The method of claim 5, wherein the dithering algorithm for the second diffusion filter w in the step (d) is as below:

$$f\text{Rand}=(R(m,t)/R\_MAX-0.5)\times c\text{Dither}$$

$$dw_0=w_0-f\text{Rand}$$

$$dw_2=w_2+f\text{Rand}$$

$$dw_1=w_1+f\text{Rand}$$

$$dw_3=w_3-f\text{Rand}$$

wherein, fRand is a parameter for fine adjusting dithering; R(m, t) is a parameter with random value for scanning a current dot; R_MAX is a maximum of a random parameter R(i); cDither is a parameter for adjusting amplitude of dithering; and $dw_0 \sim dw_3$ are the diffusion weight coefficients of the second diffusion filter w in different directions after dithering.

7. A system for scanning and processing an image using the error diffusion screening technology, comprising a scanning device, a storing device and a processing device, wherein the scanning device has an output terminal connected to an input terminal of the storing device, the storing device has an output terminal connected to an input terminal of the processing device, the scanning device scans each pixel $M_i$ of an n$^{th}$ line in an original image one by one, and a scanning result of the pixel $M_i$ is stored to the storing device; and wherein the processing device processes stored data for the pixel $M_i$ by using error diffusion, once processing for the pixel $M_i$ is completed, a obtained value for the pixel $M_i$ is output so that an i$^{th}$ storage location in the storing device can be idle, at the same time, the scanning device scans pixels of an n+1$^{th}$ line in the original image, once the i$^{th}$ storage location in the storing device is idle, scanned data for a pixel in the n+1$^{th}$ line is stored to the i$^{th}$ storage location, and once all pixels in the n$^{th}$ line have been processed, all pixels in the n+1$^{th}$ line have been scanned and stored, a processing direction parameter C of the n$^{th}$ line and a storing location parameter H for a beginning pixel of the n+1$^{th}$ line are recorded, and the processing direction of the n+1$^{th}$ line is determined based on values of the parameters C and H, and wherein C=0 indicates that pixels in the n$^{th}$ line are processed from beginning to end; C=1 indicates that pixels in the n$^{th}$ line are processed from end to beginning; H=0 indicates that the beginning pixel of the n+1$^{th}$ line is stored in a first location of a storing device; and H=1 indicates that the beginning pixel of the n+1$^{th}$ line is stored in a last location of the storing device.

8. The method of claim 1, wherein the error diffusion further comprises:
- (a) scanning and inputting the original image, carrying out an operation of a threshold comparison on a final value g"(m, t) of a current pixel in the original image, and then converting a result of the operation to an output value b(m, t) of the current pixel;
- (b) comparing the output value b(m, t) of the current pixel with a medium value g'(m, t) of the current pixel to obtain an error value e(m, t) of the current pixel;
- (c) multiplying the error value e(m, t) by preset weight distribution coefficients through a first diffusion filter e and then diffusing results of the multiplying to unprocessed pixels around the current pixel, wherein each of the diffused results to the unprocessed pixels around the current pixel is weightedly added to an original value g(m, t) of the pixel $M_x$ to obtain a new medium value g'(m, t) of the pixel $M_x$;

(d) diffusing processed results to corresponding pixels $M_x$ surrounding the current pixel, respectively, and weightedly adding each of the diffused processed results to the medium value g'(m, t) of the corresponding pixel $M_x$ obtained from error diffusion in the step (c) to obtain the final value g"(m, t) of the corresponding pixel $M_x$, wherein the processed results are obtained by implementing a multiplying operation on the output value b(m, t) of the current pixel using a second diffusion filter w and processing results of the multiplying operation with a dithering algorithm, and the step (d) is implemented in parallel with the steps (b) and (c); and (e) repeating the steps (a)-(d) until the original input values g(m, t) of all pixels are processed.

9. The method of claim 8, wherein the first error diffusion filter e in the step (c) uses a diffusion principle and weight distribution coefficients as below:

|  |  | ** | $d_5$ | $d_3$ |
|---|---|---|---|---|
| $d_2$ | $d_4$ | $d_5$ | $d_4$ | $d_2$ |
| $d_1$ | $d_2$ | $d_3$ | $d_2$ | $d_1$ | wherein,  represents the current pixel's position, each of $d_1$ to $d_5$ on other positions represents the diffusion weight coefficient relative to the current pixel , and $d_1$ to $d_5$ are taken in [0, 1] and satisfy the following expression:

$$2 \times d_1 + 4 \times d_2 + 2 \times d_3 + 2 \times d_4 + 2 \times d_5 \in [0,1].$$

10. The method of claim 9, wherein a diffusion mode of the second diffusion filter w is set as:

|  | ** | $w_0$ |
|---|---|---|
| $w_3$ | $w_2$ | $w_1$ | wherein, a scanning direction is from left to right, ** represents the current pixel's position, each of $w_0$ to $w_3$ on other positions represents the diffusion weight coefficient relative to the current pixel, and $w_0$ to $w_3$ are taken in [0, 1] and satisfy the following expression:

$$w_0 + w_1 + w_2 + w_3 \in [0, 1].$$

11. The method of claim 10, wherein the dithering algorithm for the second diffusion filter w in the step (d) is as below:

$$f\text{Rand} = (R(m,t)/R\_MAX - 0.5) \times c\text{Dither}$$

$$dw_0 = w_0 - f\text{Rand}$$

$$dw_2 = w_2 + f\text{Rand}$$

$$dw_1 = w_1 + f\text{Rand}$$

$$dw_3 = w_3 - f\text{Rand}$$

wherein, fRand is a parameter for fine adjusting dithering; R(m, t) is a parameter with random value for scanning a current dot; R_MAX is a maximum of a random parameter R(i); cDither is a parameter for adjusting amplitude of dithering; and $dw_0 \sim dw_3$ are the diffusion weight coefficients of the second diffusion filter w in different directions after dithering.

12. The method of claim 1, wherein the error diffusion further comprises:

(a) scanning and inputting the original image, carrying out an operation of a threshold comparison on a final value g"(m, t) of a current pixel in the original image, and then converting a result of the operation to an output value b(m, t) of the current pixel;

(b) comparing the output value b(m, t) of the current pixel with a medium value g'(m, t) of the current pixel to obtain an error value e(m, t) of the current pixel;

(c) multiplying the error value e(m, t) by preset weight distribution coefficients through a first diffusion filter e and then diffusing results of the multiplying to unprocessed pixels around the current pixel, wherein each of the diffused results to the unprocessed pixels around the current pixel is weightedly added to an original value g(m, t) of the pixel $M_x$ to obtain a new medium value g'(m, t) of the pixel $M_x$;

(d) diffusing processed results to corresponding pixels $M_x$ surrounding the current pixel, respectively, and weightedly adding each of the diffused processed results to the medium value g'(m, t) of the corresponding pixel $M_x$ obtained from error diffusion in the step (c) to obtain the final value g"(m, t) of the corresponding pixel $M_x$, wherein the processed results are obtained by implementing a multiplying operation on the output value b(m, t) of the current pixel using a second diffusion filter w and processing results of the multiplying operation with a dithering algorithm, and the step (d) is implemented in parallel with the steps (b) and (c); and (e) repeating the steps (a)-(d) until the original input values g(m, t) of all pixels are processed.

13. The method of claim 12, wherein the first error diffusion filter e in the step (c) uses a diffusion principle and weight distribution coefficients as below:

|  |  | ** | $d_5$ | $d_3$ |
|---|---|---|---|---|
| $d_2$ | $d_4$ | $d_5$ | $d_4$ | $d_2$ |
| $d_1$ | $d_2$ | $d_3$ | $d_2$ | $d_1$ | wherein,  represents the current pixel's position, each of $d_1$ to $d_5$ on other positions represents the diffusion weight coefficient relative to the current pixel , and $d_1$ to $d_5$ are taken in [0, 1] and satisfy the following expression:

$$2 \times d_1 + 4 \times d_2 + 2 \times d_3 + 2 \times d_4 + 2 \times d_5 \in [0,1].$$

14. The method of claim 13, wherein a diffusion mode of the second diffusion filter w is set as:

|  | ** | $w_0$ |
|---|---|---|
| $w_3$ | $w_2$ | $w_1$ | wherein, a scanning direction is from left to right, ** represents the current pixel's position, each of $w_0$ to $w_3$ on other positions represents the diffusion weight coefficient relative to the current pixel, and $w_0$ to $w_3$ are taken in [0, 1] and satisfy the following expression:

$$w_0 + w_1 + w_2 + w_3 \in [0, 1].$$

15. The method of claim 14, wherein the dithering algorithm for the second diffusion filter w in the step (d) is as below:

$f\text{Rand} = (R(m,t)/R\_MAX - 0.5) \times c\text{Dither}$ $dw_0 = w_0 - f\text{Rand}$ $dw_2 = w_2 + f\text{Rand}$ $dw_1 = w_1 + f\text{Rand}$ $dw_3 = w_3 - f\text{Rand}$ wherein, fRand is a parameter for fine adjusting dithering; R(m, t) is a parameter with random value for scanning a current dot; R_MAX is a maximum of a random parameter R(i); cDither is a parameter for adjusting amplitude of dithering; and $dw_0 \sim dw_3$ are the diffusion weight coefficients of the second diffusion filter w in different directions after dithering.

16. The method of claim 2, wherein the error diffusion further comprises:
  (a) scanning and inputting the original image, carrying out an operation of a threshold comparison on a final value g"(m, t) of a current pixel in the original image, and then converting a result of the operation to an output value b(m, t) of the current pixel;
  (b) comparing the output value b(m, t) of the current pixel with a medium value g'(m, t) of the current pixel to obtain an error value e(m, t) of the current pixel;
  (c) multiplying the error value e(m, t) by preset weight distribution coefficients through a first diffusion filter e and then diffusing results of the multiplying to unprocessed pixels around the current pixel, wherein each of the diffused results to the unprocessed pixels around the current pixel is weightedly added to an original value g(m, t) of the pixel $M_x$, to obtain a new medium value g'(m, t) of the pixel $M_x$;
  (d) diffusing processed results to corresponding pixels $M_x$ surrounding the current pixel, respectively, and weightedly adding each of the diffused processed results to the medium value g'(m, t) of the corresponding pixel $M_x$ obtained from error diffusion in the step (c) to obtain the final value g"(m, t) of the corresponding pixel $M_x$, wherein the processed results are obtained by implementing a multiplying operation on the output value b(m, t) of the current pixel using a second diffusion filter w and processing results of the multiplying operation with a dithering algorithm, and the step (d) is implemented in parallel with the steps (b) and (c); and
  (e) repeating the steps (a)-(d) until the original input values g(m, t) of all pixels are processed.

17. The method of claim 16, wherein the first error diffusion filter e in the step (c) uses a diffusion principle and weight distribution coefficients as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein,  represents the current pixel's position, each of $d_1$ to $d_5$ on other positions represents the diffusion weight coefficient relative to the current pixel , and $d_1$ to $d_5$ are taken in [0, 1] and satisfy the following expression:

$2 \times d_1 + 4 \times d_2 + 2 \times d_3 + 2 \times d_4 + 2 \times d_5 \in [0,1]$.

18. The method of claim 17, wherein a diffusion mode of the second diffusion filter w is set as:

|       | **    | $w_0$ |
|-------|-------|-------|
| $w_3$ | $w_2$ | $w_1$ | wherein, a scanning direction is from left to right, ** represents the current pixel's position, each of $w_0$ to $w_3$ on other positions represents the diffusion weight coefficient relative to the current pixel, and $w_0$ to $w_3$ are taken in [0, 1] and satisfy the following expression:

$w_0 + w_1 + w_2 + w_3 \in [0, 1]$.

19. The method of claim 18, wherein the dithering algorithm for the second diffusion filter w in the step (d) is as below:

$f\text{Rand} = (R(m,t)/R\_MAX - 0.5) \times c\text{Dither}$ $dw_0 = w_0 - f\text{Rand}$ $dw_2 = w_2 + f\text{Rand}$ $dw_1 = w_1 + f\text{Rand}$ $dw_3 = w_3 - f\text{Rand}$ wherein, fRand is a parameter for fine adjusting dithering; R(m, t) is a parameter with random value for scanning a current dot; R_MAX is a maximum of a random parameter R(i); cDither is a parameter for adjusting amplitude of dithering; and $dw_0 \sim dw_3$ are the diffusion weight coefficients of the second diffusion filter w in different directions after dithering.

* * * * *

UNITED STATES PATENT AND TRADEMARK OFFICE
CERTIFICATE OF CORRECTION

PATENT NO. : 8,411,310 B2
APPLICATION NO. : 12/438533
DATED : April 2, 2013
INVENTOR(S) : Bin Yang et al.

Page 1 of 1

It is certified that error appears in the above-identified patent and that said Letters Patent is hereby corrected as shown below:

In the Claims

Column 6, Line 54, Claim 1, delete "H=1indicates" and insert -- H=1 indicates --

Column 8, Line 66, Claim 8, delete "$M_x$," and insert -- $M_x$ --

Column 9, Line 45, Claim 10, delete "$w_o+w_i+w_2+w_3 \in [0, 1]$." and insert
-- $w_0+w_1+w_2+w_3 \in [0,1]$. --

Column 11, Line 33, Claim 16, delete "$M_x$," and insert -- $M_x$ --

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,411,310 B2  
APPLICATION NO. : 12/438533  
DATED : April 2, 2013  
INVENTOR(S) : Yang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

First Day of September, 2015

Michelle K. Lee
*Director of the United States Patent and Trademark Office*